United States Patent [19]
Yeh et al.

[11] Patent Number: 5,742,804
[45] Date of Patent: Apr. 21, 1998

[54] INSTRUCTION PREFETCH MECHANISM UTILIZING A BRANCH PREDICT INSTRUCTION

[75] Inventors: Tse-Yu Yeh, Milpitas; Mircea Poplingher, Campbell; Kent G. Fielden, Sunnyvale; Hans Mulder, San Francisco; Rajiv Gupta, Los Altos; Dale Morris, Menlo Park; Michael Schlansker, Los Altos, all of Calif.

[73] Assignee: Institute for the Development of Emerging Architectures, L.L.C., Cupertino, Calif.

[21] Appl. No.: 685,607

[22] Filed: Jul. 24, 1996

[51] Int. Cl.$^6$ ........................................... G06F 9/38
[52] U.S. Cl. .............................. 395/584; 395/383
[58] Field of Search ...................... 395/383, 389, 395/571, 584, 586, 709, 582, 585

[56] References Cited

U.S. PATENT DOCUMENTS

| | | | |
|---|---|---|---|
| 3,551,895 | 12/1970 | Driscoll, Jr. | 395/584 |
| 3,573,854 | 4/1971 | Watson et al. | 395/584 |
| 4,439,827 | 3/1984 | Wilkes | 395/582 |
| 5,423,048 | 6/1995 | Jager | 395/585 |
| 5,450,556 | 9/1995 | Slavenburg et al. | 395/582 |

OTHER PUBLICATIONS

Lilja, David J., Reducing the Branch Penalty in Pipelined Processors, IEEE, pp. 47–55, Jul. 1988.

Chi et al., Compiler Driven Data Cache Prefetching for High Performance, IEEE, pp. 274–278, Sep. 1994.

Chen et al., A Performance Study of Software and Hardware Data Prefetching Schemes, IEEE, pp. 223–232, Apr. 1994.

Sites et al., Alpha Architecture Reference Manual, Digital Equipment Corporation, pp. (I) 4–115,4–116, A–10,A–11, Jul. 1992.

*Primary Examiner*—William M. Treat
*Assistant Examiner*—Patrice L. Winder
*Attorney, Agent, or Firm*—Blakely Sokoloff Taylor & Zafman LLP

[57] ABSTRACT

A processor and method that reduces instruction fetch penalty in the execution of a program sequence of instructions comprises a branch predict instruction that is inserted into the program at a location which precedes the branch. The branch predict instruction has an opcode that specifies a branch as likely to be taken or not taken, and which also specifies a target address of the branch. A block of target instructions, starting at the target address, is prefetched into the instruction cache of the processor so that the instructions are available for execution prior to the point in the program where the branch is encountered. Also specified by the opcode is an indication of the size of the block of target instructions, and a trace vector of a path in the program sequence that leads to the target from the branch predict instruction for better utilization of limited memory bandwidth.

12 Claims, 1 Drawing Sheet

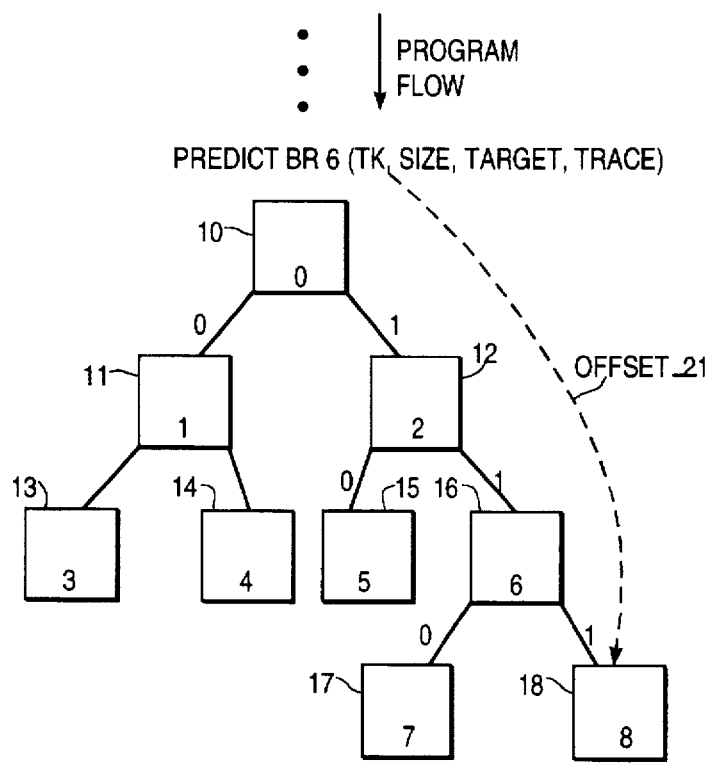
FIG_1
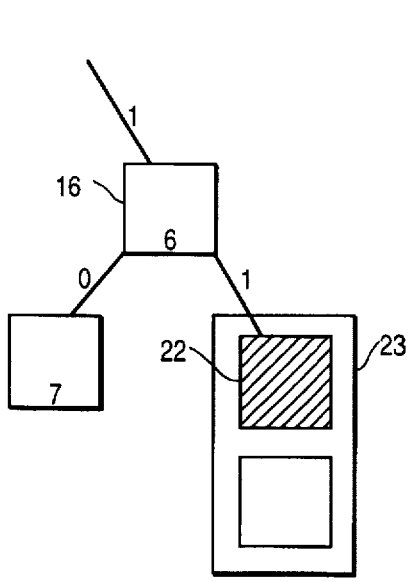
FIG_2
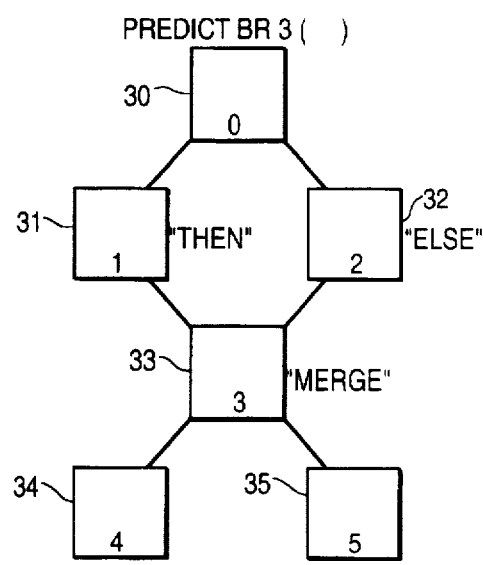
FIG_3

INSTRUCTION PREFETCH MECHANISM UTILIZING A BRANCH PREDICT INSTRUCTION

RELATED APPLICATIONS

The present application is related to pending U.S. patent application entitled "A Method of Modifying an Instruction Set Architecture of a Computer Processor to Maintain Backward Compatibility", Ser. No. 08/530,614, filed Sep. 19, 1995, which application is assigned to the Assignee of the present application, was issued on Dec. 23, 1997, U.S. Pat. No. 5,701,442.

FIELD OF THE INVENTION

The present invention relates to the field of high performance microprocessors and, more particularly, to the instruction set architecture of a processor and methods for improving programming flow.

BACKGROUND OF THE INVENTION

As the operating frequencies of microprocessors continues to rise, performance often depends upon providing a continual stream of instructions and data in accordance with the computer program that is running. As such, many processors include branch prediction circuitry that is used to predict branch addresses and to cause the prefetching of instructions in the instruction stream before they are needed. For example, U.S. Pat. No. 5,469,551 discloses a branch prediction circuit along with a subroutine stack used to predict branch address and prefetch at the instruction stream. To maintain sequentiality of the instruction stream, the aforementioned patent also teaches a conditional move instruction that substitutes for short branches.

As application programs get larger, instruction fetch penalty has become one of the major bottlenecks in system performance. Instruction fetch penalty refers to the number of cycles spent in fetching instruction from different levels of cache memories and main memory. Instruction prefetch is an effective way to reduce the instruction fetch penalty by prefetching instructions from long-latency cache memories or main memory to short-latency caches. Therefore, when instructions are actually demanded, the fetch penalty of the instructions is small.

It is important for the instruction prefetch mechanism to acquire the correct instructions. Because a prefetch needs to be performed before the program actually reaches the prefetch target, the prefetch target is often chosen based on a prediction of the branch. When a branch is predicted correctly, the demanded instructions are prefetched into short-latency caches, thus reducing the fetch penalty. However, when a branch is predicted incorrectly, the prefetched instructions are not useful. In some cases, incorrectly prefetched instructions can actually be harmful to the program flow because they cause cache pollution. In addition, often times prefetching incorrect branch targets results in a "stall" condition in which the processor is idle while the main memory or long-latency cache memories are busy acquiring the critically-demanded instructions.

To overcome these difficulties, designers have developed systems and methods for avoiding stalls by using an existing load instruction for prefetching information from main memory and storing it in a cache before a cache miss occurs. By way of example, U.S. Pat. No. 5,396,604 teaches an approach that obviates the need for defining a new instruction in the instruction set architecture of the processor.

Yet another approach for reducing the cache miss penalty is to maintain a scoreboard bit for each word in a cache line in order to prevent the writing over of words previously written by a store instruction. U.S. Pat. No. 5,471,602 teaches a method for improving performance by allowing stores which miss the cache to complete in advance of the miss copy-in.

While each of these systems and methods provides improvement in processor performance, there still exists a need to increase the accuracy of the prefetch operation. In other words, by its nature prefetching is a speculative operation. In previous architectures, hardware implementations have been used to bring instructions into the machine prior to execution. Past approaches, however, have failed to make best use of memory bandwidth by specifying how much to prefetch, in addition to where and when to prefetch instructions. That is, many machines simply prefetch in the next sequential line of instructions following a cache miss because most instructions exhibit sequential behavior.

To minimize the instruction fetch penalty and to increase the accuracy of prefetching operations, it is therefore desirable to provide a new mechanism for instruction prefetching.

SUMMARY OF THE INVENTION

The present invention provides a branch predict instruction for prefetching instructions into an on-chip cache before the instructions are actually encountered in a programmed sequence of instructions. Including one or more branch predict instructions in the instruction program flow minimizes instruction fetch penalty and assists the instruction prefetching operation by making optimum use of memory bandwidth.

In one embodiment, the invention comprises a method for reducing instruction fetch penalty in the execution of a programmed sequence of instructions which include branches. According to the invented method, a branch predict instruction—which is a hint instruction having an opcode that specifies a branch as likely to be "taken" or "not taken"—is inserted into the program sequence. The opcode also specifies a target address of the branch. Architecturally, the branch predict instruction is effectively a "no-operation" (NOP) instruction which otherwise has no effect on the architectural state of the microprocessor. Furthermore, the branch predict instruction is inserted at a location in the programmed sequence which precedes the branch by a number of instructions.

The branch predict instruction causes the prefetching of a block of target instructions, starting at the target address specified in the opcode of the branch. The block of target instructions is prefetched into the instruction cache of the microprocessor, these instructions are then available for execution prior to the point in the program where the branch is encountered.

In other embodiments, the opcode of the branch predict instruction further specifies a size of the block of target instructions and a trace vector of a path in the programmed sequence that leads to the target from the branch predict instruction.

BRIEF DESCRIPTION OF THE DRAWINGS

The novel features which are characteristic of the present invention are set forth in the appended claims. The invention itself, however, as well other features and advantages, is best understood with reference to the detailed description which follows, read in conjunction with the accompanying drawings and wherein:

FIG. 1 shows a programming sequence of a computer program as an instruction flow tree. The diagram also illustrates the insertion of a branch predict instruction into the programmed sequence.

FIG. 2 illustrates the specification of the size of a target block of instructions in accordance with one embodiment of the present invention.

FIG. 3 is an instruction flow tree of a programming example according to one embodiment of the present invention.

DETAILED DESCRIPTION

The present invention provides a system and method for passing static information from a compiler to a processing hardware using a branch predict instruction. The branch predict instruction provides advance information about program flow to increase the accuracy of prefetching operations. In the following description numerous specific details are set forth, such as particular information fields, processor structures, encodings, etc., in order to provide a thorough understanding of the present invention. It should be understood, however, that these specific details need not be used to practice the present invention. In other instances, well-known structures, circuits, methods, etc., have not been shown in detail to avoid obscuring the invention.

Instruction prefetching is a well-known mechanism that brings instructions from the memory hierarchy structure closer to the execution core before the instructions are actually encountered in the program execution. Most often, instructions are fetched from a main memory or secondary cache memory and loaded into an on-chip local cache memory. By having the instructions closer to the execution core, instruction demand misses are minimized when instructions are actually encountered.

Referring to FIG. 1, there is shown a branch predict instruction of the present invention. The branch predict instruction has been inserted into a programmed sequence of instructions, shown in FIG. 1 as an instruction flow tree. The branch predict instruction assists in the instruction prefetch by providing information regarding branches before the branches are actually encountered by the "front-end" of the machine. (The "front-end" of the machine refers to the instruction fetching and decoding hardware of a microprocessor, whereas the term "back-end" refers to the operations associated with the execution and/or retirement of instructions in a computer program.) The branch predict instruction of the present invention prepares the operation of the branch prediction circuitry in the microprocessor so that when the branch is encountered in the program flow, all of the instructions and information is available for making the prediction. Instruction flow can therefore continue without incurring a stall or miss penalty.

Practitioners skilled in the art of computer programming and computer architecture will appreciate that the branch predict instruction of the present invention does not change the architectural state of the microprocessor. It simply passes down static information from the compiler to the hardware. In the machine's back-end—where instructions are executed and the architectural state of the machine is updated—the branch predict instruction is simply treated as a no-operation (NOP). Included within the branch predict instruction are various opcode fields that are used to encode necessary information that is passed from the compiler to the hardware. In this way, the present invention provides information about the target address of the branch, how likely the branch is to be taken (or not taken), the size of the block of the target instructions, and a cancellation trace vector.

By way of example, in the exemplary embodiment of FIG. 1, the branch predict instruction is shown as:

Predict BR#6(TK,size,target,trace)

The branch predict instruction is inserted into the program flow to assist in instruction prefetching. This branch predict instruction is useful in statically predicting branches by providing a target address and the likely predicted path of the branch; specifically, whether the branch will be taken based upon the static information acquired by a compiler and inserted into the opcode before run-time execution.

Practitioners skilled in the art will appreciate the importance of the invented branch predict instruction to prefetching operations. By careful insertion of the branch predict instruction into the program flow, information is provided as to where in the instruction flow path prefetching operations should commence. In addition, information concerning the size and trace vector for the associated path is also conveyed. Details of this aspect of the invention will be described below.

In the illustration of FIG. 1, each of the squares 10–18 represent a basic block of instructions. The basic block of instructions is a contiguous sequence of instructions that may be stored as such in a random-access memory (RAM) device. For prefetching considerations, it is desirable to move the branch predict instruction as far back from the target basic block as reasonable. This is because prefetching most often occurs from main memory to an on-chip cache, and it is desirable to provide enough time to fetch the instructions without incurring a stall.

At the same time, however, there is a competing concern regarding the placement of a branch predict instruction in the program flow that can arise when the instruction tree has a large fan-out. In this situation, there may be a great number of branch predict instructions placed near the top of a tree structure that creates many branch predict requests. These branch predict requests may compete for cache memory storage space and bandwidth. This gives rise to the need for a cancellation policy.

With continued referenced to FIG. 1, the opcode field of the hint instruction includes an indication whether a branch is likely to be taken or not taken. This is represented in FIG. 1 by the notation "TK" (or, alternatively, "NTK") in the field of the Predict BR6 instruction. The Predict BR6 instruction in this simple example provides hint information about branch #6, designated as block 16 in FIG. 1. To provide this hint information about branch #6 at the end of basic block #0 (labeled block 10 in FIG. 1), the branch predict instruction is inserted into the program flow by the compiler at the top of the tree. A taken branch is denoted by the number "1" whereas a not taken branch is denoted by the number "0" for each of the branch segments in FIG. 1. Thus, it can be seen that the path from block #10 to block #16 (i.e., from basic block #0 to basic block #6) comprises two taken paths.

Again, it should be kept in mind that there exists a tradeoff respecting how far back in the program flow the branch predict instruction should be placed. This is because whenever there is a move across a branch, there is a need to predict in some way whether the branch will be taken. The further away from the branch a predict instruction is inserted, the more likely it will be that the prediction may be wrong. Therefore, an optimum distance, consisting of a number of instructions away from the target, is determined based on considerations such as the size of the working set, the size of the cache memory storage capacity, time to load cache memory, etc. According to the branch information, the likely target of a branch can be prefetched. If the branch predict instruction is placed at a distance far away from the branch, the target of the branch can be fetched into the on-chip cache before the branch is actually encountered.

According to the embodiment of FIG. 1, size information is also provided by the opcode field of the branch predict instruction. This size information refers to the size of the target basic block for streaming prefetch operations. Streaming prefetching refers to a prefetch that is triggered from an earlier prefetch to a sequential address. Based on the prefetch address of a previous request, a next sequential address is generated for fetching instructions. This is particularly useful when the program is sequential by nature and the size of the target block is large. According to the embodiment of FIG. 1, the size of the target basic block is indicated as being either large or small. This information is encoded in a binary fashion with one bit allocated for size. Skilled practitioners will understand that the size field can benefit from more bits, if they available, because the exact number of instructions to fetch can then be measured more accurately.

If the basic block exceeds a predetermined quantity (e.g., 64 bytes) it is marked as being large. This situation is illustrated in the diagram of FIG. 2, wherein the target block 22 comprises several blocks which is shown as a larger block 23. When a basic block is indicated as being large, a streaming prefetch operation is commenced. The streaming prefetch operation handles subsequent prefetches in a sequential manner that is implementation dependent. Note that when the target basic block is large, instructions for that basic block can be prefetched using just one branch predict instruction. All of the required instructions are streamed into the cache, ready for instruction fetching.

Alternatively, an indication that the basic block is small means that, for this example, the target basic block is less than 64 bytes.

Referring back to FIG. 1, the indication "TK" means that prefetching begins from the target of this branch. Another piece of information that is provided in the embodiment of FIG. 1 is the offset from the branch predict instruction to the target block. The branch predict instruction stores the address of the branch using an offset from the predict instruction to the branch. In the example of FIG. 1, the target block is block 18 and the offset to the target block is shown by dashed line 21. In this way, information is provided as to where the branch is, as well as where the target is, for prefetching purposes. When the indication of the predict instruction is taken (TK) it is known that prefetching should begin from the target address. Note that in the case where a branch is not taken (NTK) the branch predict instruction keys the hardware into what operations actually need to be performed. For example, it may be useful to provide information that a particular branch is not taken as a way of providing the hardware with advanced information about a certain branch instruction.

As explained above, insertion of many branch predict instructions into the program flow could lead to an excessively large number of prefetchings. In the example of FIG. 1, if the program actually flows down the path to branch #6 we have prefetched the correct instruction blocks. However, consider what would happen if there was also a branch predict instruction inserted into the program flow for branch #5. In this situation, as the program flow flows down to the point where it is known that there is no need to prefetch for branch #5, whatever was issued as a prefetch request down this incorrect path is now useless. For optimum performance, this request should be canceled. In one embodiment of the present invention, a prefetch request cancellation policy is implemented by encoding a special trace vector. The trace vector indicates the path from where the branch predict instruction is located to the target block.

In the example of FIG. 1, the target address is simply notated as "target" in the opcode field of the branch predict instruction. The trace vector is notated by the notation "trace" in the opcode field. This special trace vector, in one embodiment, is a 3-bit field indicating that, from the branch predict instruction to the target, there are two taken paths. Thus, an appropriate trace vector encoding for the BR6 instruction is [1,1] to indicate the two taken paths. For the BR5 instruction, the trace vector encoding is [1,0] indicating a taken branch followed by a not taken branch. In the prediction pipeline, the predict results of the branch are dynamically obtained from the branch prediction unit of the microprocessor. Whenever an inconsistency is identified, the corresponding prefetch requests are canceled utilizing the trace vector.

The trace vector is generated by the compiler, which possesses the internal data structure of the program. When the compiler inserts the branch predict instruction into the program flow, it obtains information pertinent to the paths leading to the target branch. In this manner, memory bandwidth is conserved by cancellation of prefetch requests that are not actually taken.

The way that this cancellation policy is implemented in one embodiment of the present invention is by first predicting (using dynamic and static branch predictors) an execution path of the programmed sequence of instructions, and then comparing the execution path with the trace vector for the branch predict instructions. In the event that the execution path and the trace vector do not match, the prefetched request of the associated branch predict instruction is canceled. This avoids bottlenecking branch predict instructions, which can lead to an excessive number of prefetch requests.

The three bits that are utilized for encoding trace vectors of information provide encodings for two levels of the programming path. The third bit is a "don't care" condition bit that is utilized in situations where "forks" or "merges" occur in the programming path. Such a situation is illustrated in FIG. 3, wherein a fork occurs following block 30 (i.e., the fork is either to blocks 31 or 32). This fork is followed by a merge, wherein blocks 31 and 32 both lead to block 33. Practitioners in the art will understand that such situations typically arise in programs as a result of certain conditional operations. These conditional operations normally take the form:

IF some condition occurs;
THEN perform operation A;
ELSE perform operation B.

With reference to FIG. 3, the THEN operation may be included in block 31, whereas the ELSE operation is represented by block 32.

If it is desirable to prefetch instructions for block 33 (i.e., branch #3)—regardless of whether the program flows down the path which includes block 31, or block 32—eventually both paths lead to branch #3 (notated by block 33). In this situation, the first level encoding may simply be encoded as a "don't care" condition since both paths leads to the same basic block. Practitioners in the art will appreciate that by encoding two levels of the programming path, this embodiment of the invention encodes eight combinations out of nine possible encodings.

Practitioners will also appreciate that the method of the present invention is useful for both "instruction pointer relative" branches as well as "indirect" branches. Instruction pointer relative branches calculate target addresses using simple adders from the instruction itself. Indirect branches, on the other hand, store the target address in a branch register. This information is not known from the instruction itself, since the instruction only provides an index to the branch register. This means that an extra operation must be performed to read the value from the branch register to obtain the target address. However, all the hint information stated previously for the branch predict instruction can be encoded in the "MOV to BR" instruction, which can be used in the same way to prefetch instructions from the target of an indirect branch.

Whereas many alterations and modifications of the present invention will no doubt become apparent to the person of ordinary skill in the art after having read the foregoing description, it is to be understood that the particular embodiments shown and described by way of illustration are in no way intended to be considered limiting. For example, although this disclosure has described a small size as being less than 64 bytes, and 3-bits being used for a trace vector, it is appreciated that other byte and bit sizes are within the scope of the present invention. Therefore, reference to the details of the illustrations are not intended to limit the scope of the claims which themselves recite those features regarded as essential to the invention.

We claim:

1. A method of reducing instruction fetch penalty in the execution of a programmed sequence of instructions which includes branches, the method comprising the steps of:

(a) inserting at a location in the programmed sequence a branch predict instruction having an opcode that specifies a branch as taken or not taken, and a target address of the branch, and a trace vector of a path in the programmed sequence that leads to the target address from the branch predict instruction, the branch predict instruction otherwise not affecting an architectural state of the microprocessor, and wherein the location precedes the branch by a predetermined number of instructions;

(b) prefetching a block of target instructions, starting at the target address of the branch, into an instruction cache of the microprocessor before the branch is encountered in the programmed sequence.

2. The method according to claim 1 wherein the opcode further specifies a size of the block of target instructions.

3. The method according to claim 2 wherein the size is specified as large if the block target instruction is greater than 32 bytes.

4. The method according to claim 2 wherein the size is specified as large if the block target instruction is greater than 64 bytes.

5. The method according to claim 2 further comprising the step of:

repeating step (b) in a streaming operation that sequentially prefetches instructions of the block of target instructions when the size is greater than a predetermined number of bytes.

6. The method according to claim 1 further comprising the step of:

eliminating a prefetch request of a second branch predict instruction based upon a trace vector of the second branch predict instruction.

7. The method according to claim 6 wherein the eliminating step comprises the steps of:

predicting an execution path of the programmed sequence of instructions;

comparing the execution path with the trace vector of the second branch predict instruction; and canceling the prefetch request if the execution path and the trace vector of the second branch predict instruction do not match.

8. The method according to claim 1 further comprising the step of:

generating the trace vector by a compiler of the programmed sequence of instructions.

9. The method according to claim 8 wherein the trace vector comprises a bit field that encodes two or more levels of the path.

10. A microprocessor for executing a programmed set of instructions that includes a branch, the microprocessor comprising:

a decoder that decodes a branch predict instruction located within the programmed sequence a predetermined number of instructions prior to the branch, the branch predict instruction having an opcode field that specifies the branch as taken or not taken, a target address of the branch, and a trace vector of a path in the programmed sequence that leads to the target address from the branch predict instruction, execution of the branch predict instruction otherwise not affecting an architectural state of the microprocessor; and a prefetching mechanism that prefetches a target block of instructions at a target address responsive to the branch predict instruction.

11. The microprocessor of claim 10 wherein the opcode further specifies a size of the target block of instructions.

12. The microprocessor of claim 10 wherein the trace vector comprises a bit field that encodes two or more levels of the path.

* * * * *